United States Patent
Shaw

[15] 3,664,877
[45] May 23, 1972

[54] BATTERY OF CELLS AND MEANS OF ASSEMBLY

[72] Inventor: Frank Donald Shaw, c/o 143 Bermondsey Rd., Toronto 16, Ontario, Canada

[22] Filed: May 28, 1970

[21] Appl. No.: 41,240

[52] U.S. Cl. ............................................136/171, 136/181
[51] Int. Cl. .......................................................H01m 1/04
[58] Field of Search..................136/166, 171, 172, 173, 181

[56] References Cited

UNITED STATES PATENTS

| 673,678 | 5/1901 | Sutphen et al. | 136/166 |
| 754,858 | 3/1904 | Edison | 136/166 |
| 2,856,616 | 10/1958 | Dodge | 136/166 |

FOREIGN PATENTS OR APPLICATIONS

| 629,231 | 10/1961 | Canada | 136/181 |
| 659,335 | 6/1929 | France | 136/166 |

Primary Examiner—Donald L. Walton
Attorney—Douglas S. Johnson

[57] ABSTRACT

An assembly of cells is formed of insulating spacers, one between each adjacent pair of cells, each spacer having a portion bearing against side walls of a pair of adjacent cells and additional portions bearing respectively against the adjacent corners of the side and front walls; each spacer has a channel outward of the cells which channel is parallel to the front walls thereof and the line of spacers are held together in compression by a threaded tie-rod and cooperating end plates.

8 Claims, 2 Drawing Figures

Patented May 23, 1972                                              3,664,877

INVENTOR.
FRANK D. SHAW

BY Douglas L. Johnson
Attorney

BATTERY OF CELLS AND MEANS OF ASSEMBLY

FIELD OF INVENTION

This invention relates to the assembly of electrical storage batteries in any predetermined number.

BACKGROUND OF INVENTION

In storage batteries presently used, the individual storage cells of the battery are mounted in steel containers which are usually nickel-plated and eventually coated with a layer of paint, for example, in order to protect the container against corrosion. When a plurality of storage cells are assembled to form a complete storage battery care must be exercised to insulate each storage cell from the others to eliminate dielectric currents which may arise in a humid atmosphere, or from an overflow of electrolyte during filling. Storage batteries presently in use accordingly consist either of an impregnated wooden frame in which the individual storage cells are suspended at spaced intervals by means of insulated knobs or lugs, or else the individual storage cells are covered with insulating material, such for example as a layer of ebonite or synthetic rubber, and then a group of storage cells are placed in a case and wedged to secure them in position.

The insulation resulting from mounting a plurality of storage cells in a frame is greater than with other known methods of assembling storage batteries since the provision of an insulating sheet or layer of air between the various storage cells insures a better dissipation of moisture, heat and dielectric currents. The disadvantage of this method of assembling storage batteries, however, is that after a period of service the wooden frame becomes rotten in spite of the impregnation. This decay or rotting of the wood may be caused by moisture, traces of electrolyte, or the attack of various animal parasites such as termites or certain tropical insects.

In view of the above, it is an object of the invention to provide a storage battery in which any number of cells can be detachably connected at spaced intervals to provide insulating area gaps between adjacent cells.

It is a further object of the invention, to provide a novel and structurally simple combination, spacer, insulator, and support for multi-cell batteries which provides the requisite rigidity and flexibility in numbers to be assembled but which may be readily dismantled with a minimum of effort even after many years of service followed by ready replacement of a defective cell unit by fresh ones.

SUMMARY OF THE INVENTION

According to a feature of the invention, the cells are assembled in a battery by compression utilizing threaded rods, each of which are exterior of the battery, transversing a line of apertured spacers, each spacer having an inwardly vertically disposed rib which bears against adjacent side walls of adjacent storage cells. The spacer also has a vertically disposed flange integral with the rib which flange spans the space between adjacent cells and bears against the adjacent corners of the side walls. The vertically disposed flange has an integral skirt which extends below the level of the vertical rib to provide a leg which keeps the assembled cells at spaced distances apart from the surface upon which the assembly rests.

BRIEF DESCRIPTION OF DRAWINGS

The invention will now be described in relation to the accompanying drawings in which.

DETAILED DESCRIPTION OF INVENTION

Figures 1, 2:
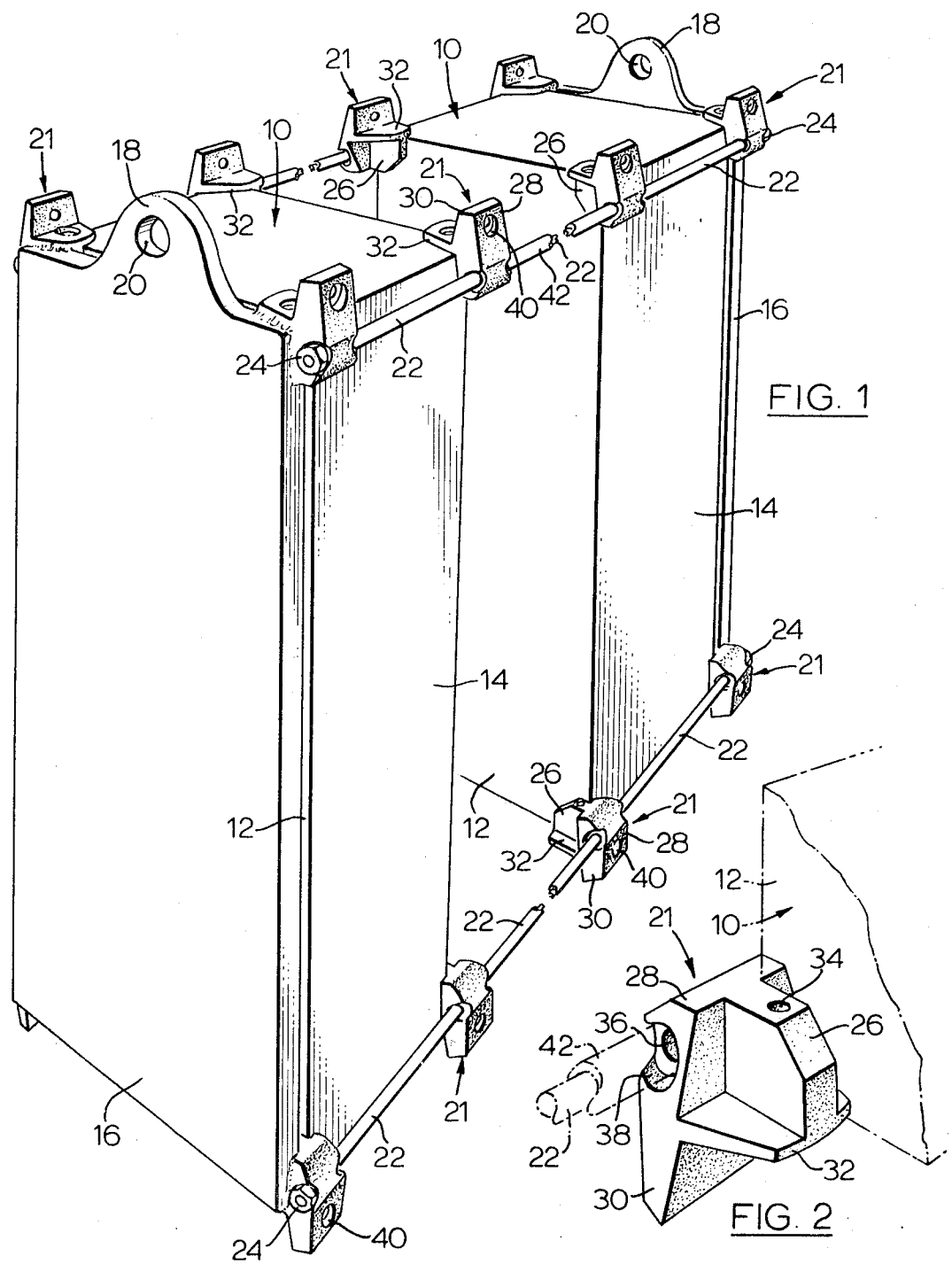
FIG. 1 is a perspective view of parts of an assembly of cells connected at spaced intervals according to the invention.
FIG. 2 is an enlarged view of the novel type of spacer of the invention.

Throughout the drawings like reference characters denote like structural parts.

Referring now to the drawings, the storage battery of the present invention includes a bank of storage cells 10 of which only two are shown, which may be of any design, size, or shape, but as illustrated, are generally rectangular in cross section and are encased in metal shells having side walls 12 and front walls 14.

The metal shells 10 can be externally coated with a protective layer of insulating material.

Storage cells 10 are positioned between end plates 16 which correspond in size with the adjacent walls 12 of the storage cells 10. However, for the purpose of handling the assembled bank of storage cells 10, the end plates 16 each have an upwardly projecting ear 18 containing an aperture 20 large enough to insert a hand or a hook for instance.

The storage cells 10 are assembled between the end plates 16 in spaced relationship by means of spacers generally noted by the numeral 21 with cooperating threaded tie-rods 22 and tightening nuts 24.

As illustrated more particularly in FIG. 2, each spacer 21 consists of a vertical rib portion 26, the sides of which bear against the adjacent side walls 12 of adjacent storage cells 10. The vertical rib portion 26 has an integral vertically disposed transverse flange 28 which extends sideways therefrom, in both directions; it will be observed from FIG. 1 that in the assembly the transverse flange 28 of the spacers 21 spans the space between adjacent cells 10 and bears against the adjacent corners of the side walls 12.

The transverse flange 28 has an integral skirt portion 30 which extends below the underside of the vertical rib portion 26. Also, the vertical rib portion 26 has an integral horizontally disposed flange 32 on its underside which extends sideways therefrom, in both directions, and joins the transverse flange 28 at its junction with the skirt 30.

The vertical rib portion 26 in each spacer 21 has a channel 34 which extends the length thereof, transversing the horizontally disposed flange 32. The transverse flange 28 has a horizontally disposed channel 36 extending therethrough with the entrance somewhat recessed as at 38. The skirt 30 has a horizontally disposed channel 40 extending therethrough but in a plane which is normal to the plane of channel 36.

The storage cells 10 are assembled in spaced relationship by inserting the vertical rib 26 of a respective spacer 20 between pairs of storage cells 10. The spacers 21 on opposed faces of the assembly are used in pairs with the lower spacer 21 having its skirt portion 30 depending downwards and the upper spacer 21 having its skirt portion extending upwards; the downwardly depending skirts 30 of the lower spacer 21 each providing a leg which maintains the underside of the storage cells 10 clear of the surface on which the assembly rests. The upper and lower spacers 21 are traversed by an individual threaded tie-rod 22 which extends through the aligned channels 36. Cooperating tightening nuts 24 on the ends of the tie-rods 22 hold the storage cells 10 and spacers 21 in fixed relationship; the nuts being located in the recesses 38 of the end spacers 21. It is an advantage of the invention that tie-rods 22 may be stored in long lengths and any selected number of cells can be assembled simply by cutting the tie-rods 22 to the required length. Preferably the tie-rods 22 are made of steel and they have a plastic sheath 42 which prevents corrosion not only during storage but also during use in the assembly.

For the purpose of insulation, each spacer 21 is preferably formed of a reinforced plastic material or an equivalent relatively indestructible insulating material.

The purpose of channels 36 and 40 in each spacer 21 is to provide means for additional rigidity whereby pairs of spacers in a horizontal or vertical plane in the assembly may also receive transversing threaded tie-rods 22. The spacers 21 adjacent to the end plate 16 may be joined thereto by a suitable means such as adhesive. It will be appreciated that an important advantage of this invention is that the assembly of storage cells 10 in any length involves the storage and use of only one variable, vis threaded tie-rods 22 and thus it eliminates the necessity of stocking a multiplicity of precision wooden parts of various lengths of batteries. Also, the invention utilizes the inherent strength of the steel cells and transfers this strength from one cell to the next by means of the tie-rods.

I claim:

1. An assembly of spaced apart cells, each having end walls and vertically disposed front walls and side walls, each pair of adjacent cells having an insulating spacer therebetween with a vertical rib portion bearing against the adjacent side walls of said pair of cells, said rib having first means bearing against the adjacent corners of the front walls thereof, said spacer extending outwardly of said pair of cells and having channel means formed therein substantially parallel to said front walls, said rib having second means bearing against adjacent corners of the end walls thereof, a pair of end plates, each one opposed to the outermost side walls of each of the endmost ones of said plurality of cells, said end plates being separated from the adjacent cell side wall by a spacer having a verticle rib portion bearing against said side wall and said end plate; threaded tie-rod means extending through said channel means of an aligned row of spacers, and means cooperating with each said rod to secure said end plates, said cells and said spacers in fixed compressive relationship.

2. An assembly according to claim 1, in which said first means is a transverse flange portion extending sideways from said rib, in both directions, to vertically span the space between said pair of adjacent cells; said second means comprising a horizontal flange extending sideways from said rib to span the space between said pair of adjacent cells.

3. An assembly according to claim 1 in which said spacers are aligned in an upper and lower row on the opposed front walls of said spaced apart cells.

4. An assembly according to claim 1 wherein each said tie-rod means is covered with a plastic sheath and said cooperating means are nuts on said tie-rod bearing against the spacers adjacent to said end plates.

5. An insulating spacer for insertion between a pair of spaced apart cells having adjacent side walls and substantially aligned front and end walls, said spacer having a vertical rib means adapted to bear against said adjacent side walls, said spacer having first means adapted to bear against the adjacent corners of said front walls and second means adapted to bear against the adjacent corners of said end walls; said spacer having channel means through an outwardly extending portion of said first means and positioned to be substantially parallel to the bearing surface of said first means.

6. An assembly of spaced apart cells according to claim 3 in which the vertical rib of each said spacers at least in each said lower row has a depending skirt portion to support said assembly of cells above the surface on which the assembly rests.

7. The spacer of claim 5 having further channel means formed therein in a position substantially normal to said first mentioned channel means.

8. The spacer of claim 7 having still further channel means formed therein in a position mutually substantially normal to each of said first mentioned channel means and said further channel means.

* * * * *